United States Patent Office 3,408,748
Patented Nov. 5, 1968

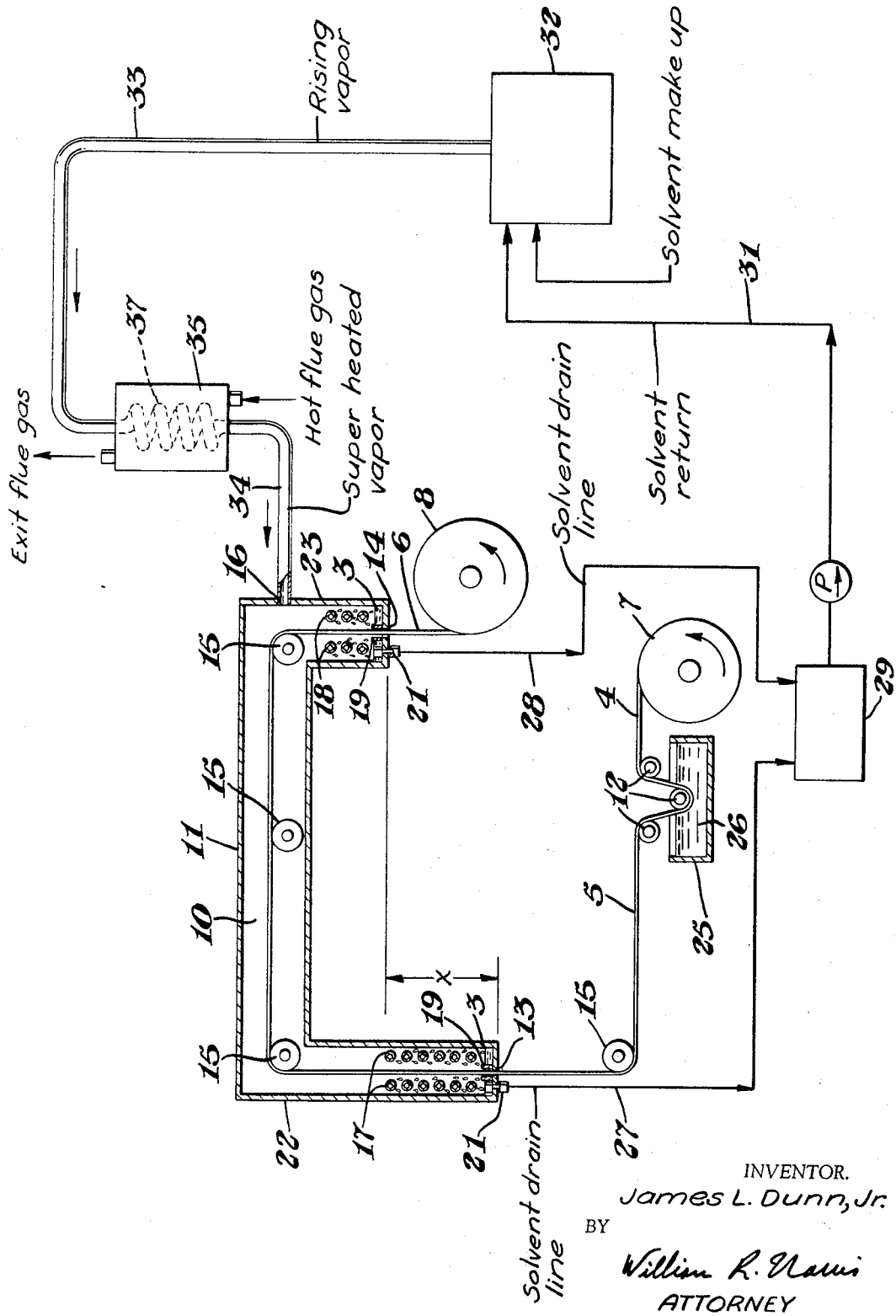

3,408,748
DRYING AND RECOVERY PROCESS
James L. Dunn, Jr., Lake Jackson, Tex., assignor to The Dow Chemical Company, Midland, Mich., a corporation of Delaware
Filed Aug. 17, 1966, Ser. No. 572,948
7 Claims. (Cl. 34—22)

The present invention involves removing volatile, liquid solvents from solid materials wetted by the solvents. More particularly, the invention involves a method for drying solvent wetted solid materials and recovering the solvent in an efficient manner.

Today there are numerous processes in which either as an incident thereto or as an object thereof, a material is wetted by a volatile liquid solvent which must be removed from the material to produce a useful product. As will be apparent to those skilled in the art, volatile solvents are frequently employed as solubilizing or dispersing mediums for coatings and treating reagents of various sorts, as well as for the purposes of cleaning and conditioning the material treated. Materials which may for one reason or another be wetted with solvents include various textile products comprising natural and synthetic fibers, threads, yarns and the numerous fabrics that may be prepared. Paper and other wet-laid or matted products of cellulosic materials are also often contacted with volatile solvents which must be removed from the material treated. Still other materials which may be contacted with volatile solvents include products of polyolefins, polystyrenes and other plastics from which films, filaments, rods, boards and shaped articles may be cast, extruded or molded. Still other products contacted by and thereby wetted with liquid solvents in various conditioning, extraction and treating processes include materials of natural origin such as wood, minerals, natural fiber and the like. In general, it may be said that there are numerous instances wherein solid materials in the form of various shapes and constructions may be wetted with a volatile liquid solvent which it is desired to remove from such material and recover.

It is an object of the present invention to provide an improved process for removing volatile liquid solvents from solid materials wetted with them. More especially, it is an object to provide a continuous process for drying materials wetted with volatile, liquid solvents, especially organic solvents, and recovering the solvent efficiently. A special object and benefit of the invention is to provide a process for drying solvent wetted materials with minimal incidental air pollution. A particular object is to provide a highly effective continuous, solvent drying process for constantly moving feed stock. The above objects and other benefits as will become apparent hereinafter, are accomplished in the present invention.

In accordance with the present invention, a process is provided for removing a volatile liquid solvent from a solid material wetted by the liquid solvent, comprising contacting said solvent-wetted solid material with superheated vapor of a stripping solvent, said vapor being at a temperature above the boiling point of the liquid solvent wetting said material, preferably at least 10° F. above such boiling point. Such contacting is efficiently achieved by introducing the material already wetted by the liquid solvent into a zone of superheated vapor of the stripping solvent, i.e. either maintaining it therein or passing it through the superheated vapor. Optionally, however, the material may be wetted by liquid solvent and dried within the same vapor zone.

The superheated vapor may be of a solvent identical to that solvent wetting the material to be dried, or if desired any second volatile liquid may be used as the stripstable for superheating above the boiling point of the wetting solvent and essentially inert to the solid material and liquid wetting solvent.

The superheated vapor of the stripping solvent is readily generated by two-step process whereby the stripping solvent is boiled and the vapor therefrom is conducted through a means for superheating gases. Any superheating means wherein the vapor can be heated above the boiling point of the stripping solvent are satisfactory for this purpose. The superheated vapors are then passed into a vapor confining zone wherein the material wetted with the liquid solvent is contained. The contact time needed to achieve a desired removal of liquid solvent from the material to be dried will, of course, vary according to the temperature of the superheated vapor and the vapor contact efficiency with the surface of material to be dried.

Although drying of materials wetted with volatile liquid solvents can be accomplished without regard to the presence of air in the superheated stripping vapor, superior results, in terms of solvent recovery efficiencies and minimization of air pollution, are achieved by generating and superheating the stripping solvent vapors, and then using them in the contact drying process, under conditions whereby air is essentially excluded from the stripping vapors. In effect, it is preferred to use an essentially air free, superheated vapor. By "air free," herein, is meant a vaporous atmosphere in which a metal surface, which is less than 10° C. below the boiling point of the liquid source for the vaporous atmosphere, e.g. the boiling point of the stripping solvent, accumulates condensate in such atmosphere. The presence of any significant amount of air in vapor at the boiling temperature of a boiling solvent will materially reduce the temperature at which condensate will be formed in such vapor. From the foregoing, it will be apparent that vapor containing air is not easily condensed and recovered as that from which air is effectively excluded.

In the accompanying drawing, the process of the invention is illustratively applied to the continuous drying of a constantly moving paper wetted with a volatile, halogenated organic solvent. The stripping solvent used is identical to the liquid solvent removed.

The basic process occurs within a superheated-vapor confining means, which essentially comprises a vertical, inverted U-shaped duct chamber 11 with an inlet 13 and outlet 14 for a continuous sheet of solvent wetted paper 5. Within the duct chamber 11 are sheet support rolls 15 which maintain the paper sheet within the duct chamber 11 on a given path. At the inlet end of the duct chamber 11 is a high capacity cooling coil 17 upon which solvent 3 is condensed, and from which solvent 3 drains into a catch basin 19 with a liquid draw-down opening 21. At the outlet end of the duct chamber 11 is a low capacity cooling coil 18. By this coil, a cold zone is maintained around the outlet 14 of the duct chamber 11 to prevent the escape of solvent vapor with the paper by condensing it.

The untreated paper 4 is fed from a feed roll 7 and passed through coating vessel 25 on guide rolls 12 wherein it is dipped in a liquid 26 comprising a treating reagent dispersed in a liquid halogenated organic solvent. The treated and solvent wetted paper 5 is then passed into the vapor zone 10 defined by the duct chamber 11.

To this vapor zone 10 is charged superheated vapor of the stripping solvent. Preferably, but not necessarily, the stripping solvent is identical or similar to the liquid solvent to be removed or from the paper 5. The superheated vapor is introduced into the duct chamber 11 at vapor inlet 16, which is just above the outlet cooling coil 18. Dry paper 6 is withdrawn from the duct chamber 11 at the outlet 14 onto a take up roll 8.

The superheated vapor generating means comprises a boiler 32. The vapor from the boiler 32 is supplied through vapor line 33 to superheating means 35 for increasing the temperature of the stripping solvent vapor above its boiling point. In the illustration, hot flue gas is used to heat coil 37 through which vapor from the boiler 32 is passed. The superheated vapor is then introduced through superheated vapor line 34 into the duct chamber 11 where it heats and vaporizes liquid solvent from paper 5. Ultimately, the stripping solvent vapor and vaporized liquid solvent are condensed on the cooling coils 17 and 18. From such coils the recovered liquid drips into catch basins 19. It then flows through solvent drain lines 27 and 28 to solvent recovery tank 29. For economy of operation, it is then recycled to the boiler 32 through feed line 31.

Most of the solvent vaporized from the paper and stripping solvent is removed on the high capacity cooling coil 17. In this manner vapor flow is set up counter current to the direction of paper movement within the duct chamber 11. The difference in the lengths of the inlet leg 22 and the outlet leg 23 of duct chamber 11, i.e. X, represents a difference in static vapor head which aids in equalizing pressure at the inlet and outlet ends. This difference should be sufficient to counteract the pressure differential generated by the constant movement of paper through the duct chamber 11.

In the practice of the invention, stripping solvents that can be used include any volatile liquid, which has a boiling point above 50° F. and which can be vaporized at its boiling point to produce vapors stable above the boiling point of the liquid solvent wetting the material to be dried. Preferably, solvents are used which produce dense vapors, e.g. having a density greater than air, to maximize the ease of solvent vapor condensation and recovery. Also the higher density vapors have greater heat capacities and thus accomplish more drying per given volume of vapor.

Suitable stripping solvents include the liquid halogenated organics such as the fluorinated, chlorinated and brominated aliphatic and cyclo aliphatic hydrocarbons. In addition, however, aromatic hydrocarbons, and even higher boiling aliphatic hydrocarbons can be used effectively as stripping solvents to generate superheated vapors.

The liquid solvent, i.e. the solvent to be removed from the solvent wetted material, may be any volatile liquid material and in general it should be inert to the stripping solvent. As previously mentioned, it is desirable to select a stripping solvent identical or at least similar in properties to the liquid solvent to be removed, but this is not necessary to successful practice of the invention. When the stripping solvent differs from the liquid solvent, the return solvent can be distilled to recover the stripping solvent for recycle.

In effect, the invention provides a novel drying process, which when carried out in a preferred manner so as to avoid introducing any air into the contact zone between the superheated vapor and solvent wetted material to be dried, excellent solvent recovery, and thus low air pollution, are achieved in the practice of the invention.

The invention is particularly well adapted to the treatment of continuous sheet materials including paper, plastics, metal foils, fabrics, fibers and the like materials which may be passed continuously through a superheated vapor contact zone. It is also applicable, however, to batch treatment of solvent wetted materials.

Most efficient use of the superheated vapor is achieved by flowing such vapor counter current to the direction of the solvent wetted feed stock. For this purpose, a flowing confined stream of superheated vapor can be established in a duct as illustrated in the drawing, that is, by cooling the vapors at the inlet and outlet of a duct. A stream of vapor can also be established by other means, such as fans in closed ducts to maintain a continuous recycling stream of vapor. Such a closed duct would have appropriately spaced condensate removal traps. To minimize vapor escape, the feed stock such as a continuous strip of paper, plastic or fabric may be admitted to the vapor contact zone through a mechanical seal.

What is claimed is:
1. A method for removing a volatile, liquid solvent from a material wetted by the solvent, which method comprises
   contacting said solvent wetted material with superheated vapor of an organic solvent in a vapor confining chamber in the substantial absence of a non-condensible gas;
   introducing said superheated vapor at a temperature and amount sufficient to provide the sole heating medium to vaporize said liquid solvent by means of said superheated vapor from said material;
   removing said organic vapor and the vapor of said liquid solvent by condensing the vapors at inlet and outlet areas of said chamber; and,
   introducing said liquid solvent wetted material through said inlet and withdrawing said material through said outlet, said inlet and outlet each being below the point of introduction of said superheated vapor and below said condensing means.

2. A method as in claim 1 wherein the liquid solvent and the vapor of an organic solvent are essentially the same material.

3. A method as in claim 1 wherein the chamber is an inverted U-shaped zone and is maintained in an upright position.

4. A method as in claim 3 wherein the pressure at the inlet and outlet of the vapor confining chamber is approximately equalized by a vapor head equal to the pressure differential generated between the inlet and outlet legs of the chamber by the continuous introduction and withdrawal of the material through the chamber.

5. An apparatus comprising a vapor confining chamber with an inlet and an outlet for passing solid material therethrough, vapor cooling means within the chamber adjacent said inlet and outlet thereof, a vapor inlet associated with a means for generating superheated vapors, said vapor inlet being above said outlet cooling means, and means within said chamber for directing a material through said chamber.

6. An apparatus as in claim 5 wherein the vapor confining chamber is an inverted U-shaped duct maintained in an essentially vertical upright operating position.

7. An apparatus as in claim 5 wherein the means for generating superheat solvent vapor comprise a boiler and auxilliary heat exchanger.

References Cited
UNITED STATES PATENTS

| | | | |
|---|---|---|---|
| 1,654,553 | 1/1928 | Neidich | 34—78 |
| 2,443,443 | 6/1948 | Chavennes | 34—77 |
| 2,312,910 | 3/1943 | Jennings. | |
| 3,087,254 | 4/1963 | Kueodera | 34—27 XR |

KENNETH W. SPRAGUE, *Primary Examiner.*

UNITED STATES PATENT OFFICE
CERTIFICATE OF CORRECTION

Patent No. 3,408,748                                  November 5, 1968

James L. Dunn

It is certified that error appears in the above identified patent and that said Letters Patent are hereby corrected as shown below:

Column 1, line 71, after "strip-" insert -- ping solvent, so long as the vapors there are sufficiently --.

Signed and sealed this 10th day of March 1970.

(SEAL)
Attest:

Edward M. Fletcher, Jr.                     WILLIAM E. SCHUYLER, JR.
Attesting Officer                            Commissioner of Patents